3,537,068
PRESSURE RESPONSIVE INDICATOR FOR PNEUMATIC TIRES
Hyrum J. Amundsen, Jr., 2809 4th St., Bakersfield, Calif. 93304
Continuation-in-part of application Ser. No. 551,623, May 20, 1966. This application Apr. 7, 1969, Ser. No. 822,822
Int. Cl. B60c 23/04
U.S. Cl. 340—58                                                13 Claims

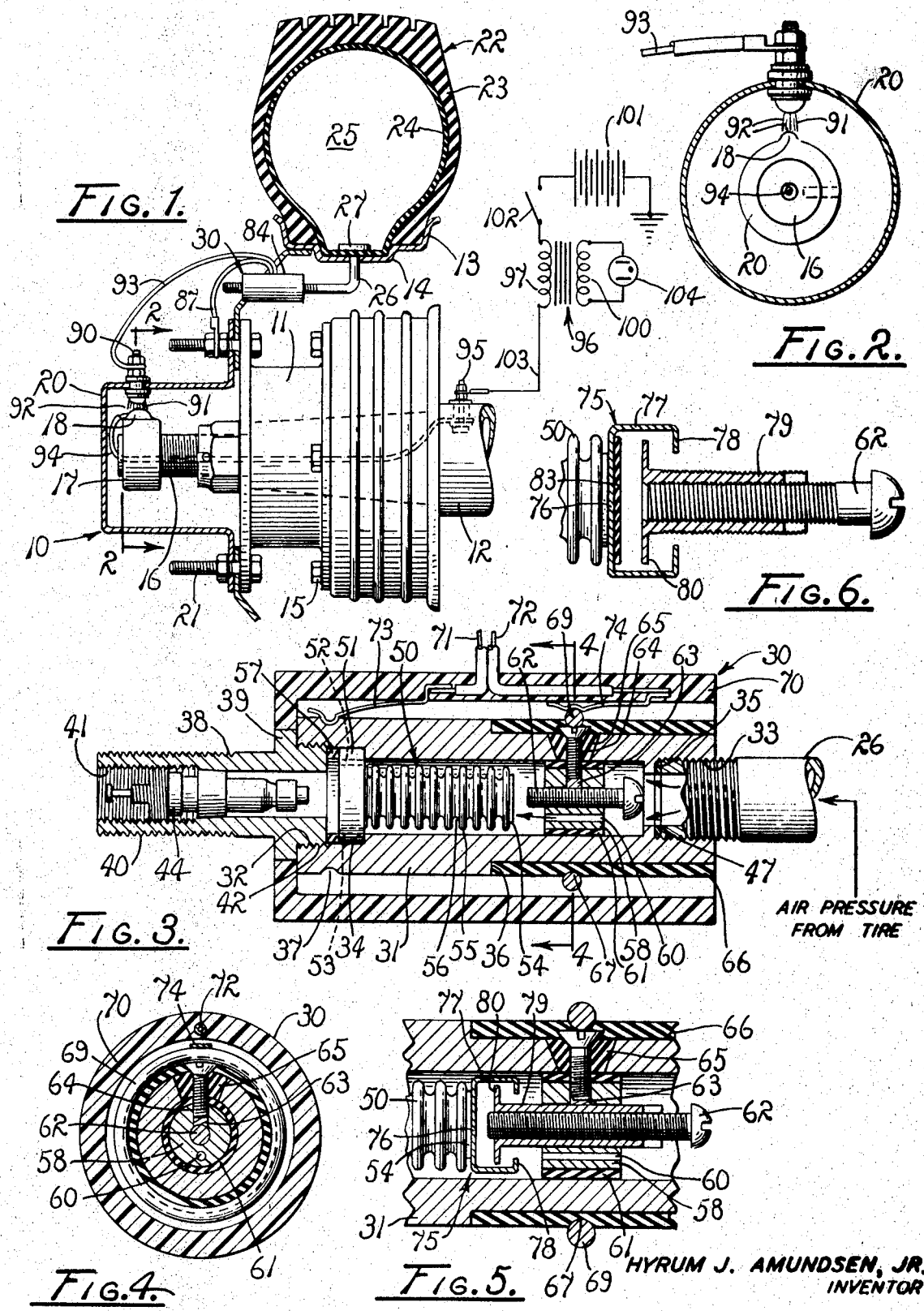

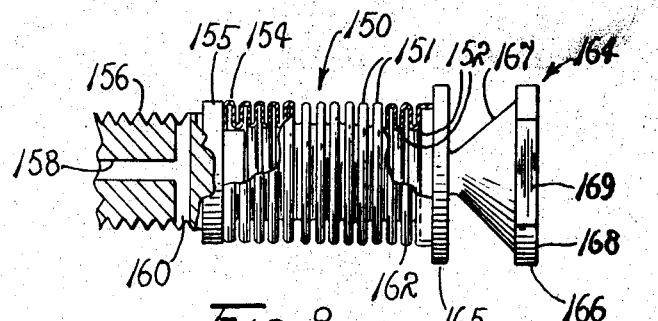
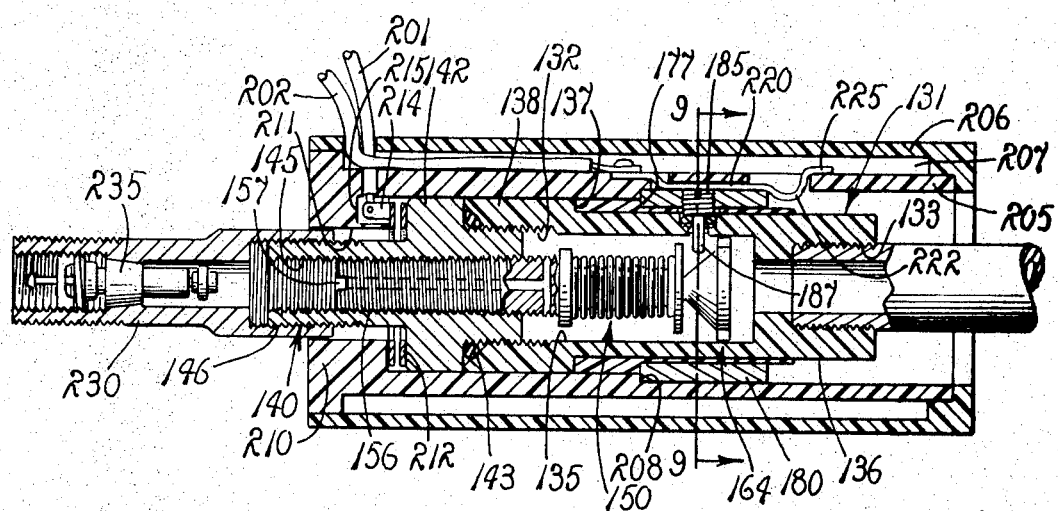
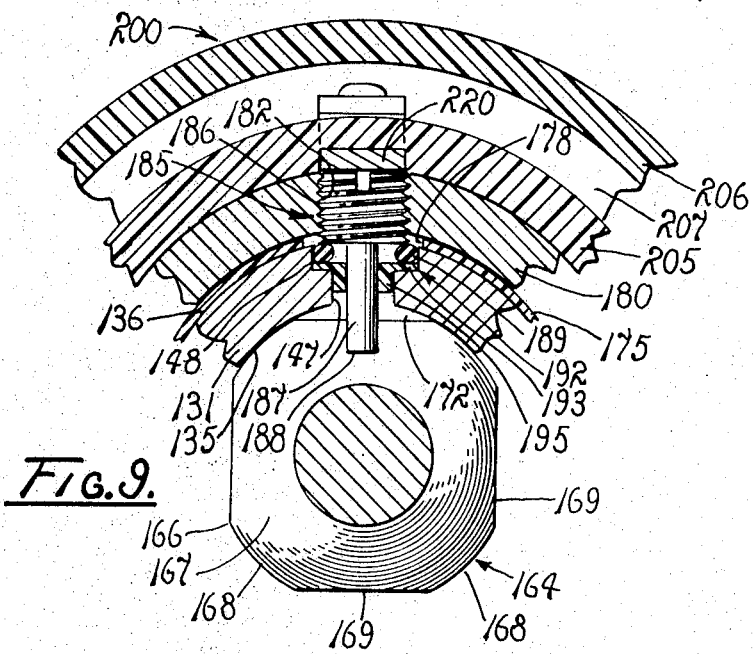
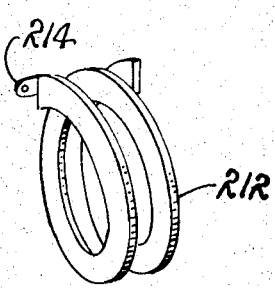
HYRUM J. AMUNDSEN, JR.
INVENTOR
Huebner & Worrel
ATTORNEYS

United States Patent Office 3,537,068
Patented Oct. 27, 1970

ABSTRACT OF THE DISCLOSURE

A pressure indicator for a pneumatic tire mounted on a wheel of a vehicle comprising an electrically conductive tube having an end adapted for connection to such a tire in pneumatic communication with the interior thereof and an opposite end releasably mounting a valve stem, an electrically conductive pressure responsive member mounted within the tube intermediate its ends for extension and retraction incident to pressure changes in the tire, spaced electrical contacts mounted on said pressure responsive means for movement therewith, and a stationary electrical contact mounted within the tube between said spaced contacts on the pressure responsive member for alternate engagement with the spaced contacts in circuit completing relation for energizing signal producing means to indicate predetermined high and low pressures in the tire.

CROSS-REFERENCE TO RELATED APPLICATION

This application is a continuation-in-part of applicant's United States application Ser. No. 551,623, filed May 20, 1966 entitled "Pressure Responsive Indicator for Pneumatic Tires," now abandoned.

BACKGROUND OF THE INVENTION

In applicant's U.S. Pat. No. 3,252,135, there is disclosed a pressure responsive indicator for pneumatic tires which includes a bellows adapted for reciprocating movement in response to increase and decrease in tire pressure. Deflation of the tire is indicated by an expansion of the bellows which makes contact with an adjustable setscrew and thereby completes an electrical circuit to signal the driver. Inflation contracts the bellows to interrupt such contact.

The present invention represents an improvement over the indicator of the applicant's aforementioned patent by providing an indicator using inexpensive components adapted to signal an increase in pressure as well as a decrease in pressure.

A further improvement over the indicator of the applicant's aforementioned patent has been made by providing a more compact unit.

A still further improvement over the indicator of the applicant's aforementioned patent has been made by improving the air leakage resistance of the indicator.

One drawback of prior art pressure indicators for pneumatic tires is their complexity and interference with removal and installation of the tires with which they are utilized when servicing is necessary. Complexity also decreases the reliability and increases the cost of such indicators. Obviously, it is desirable to provide pressure indicators containing as few moving parts as practical.

SUMMARY OF THE INVENTION

It is therefore an object of this invention to provide a pressure responsive indicator for pneumatic tires adapted to produce a signal at predetermined upper and lower pressure levels.

Another object is to provide a new and improved indicator having a minimum number of moving parts.

Another object is to provide a pressure indicator in which the components are arranged to provide a good pressure seal.

It is a further object to provide a pressure responsive indicator for pneumatic tires which may be installed and removed without difficulty thereby facilitating servicing of the tires equipped with such indicator.

Still further objects and advantages of the present invention are to provide improved elements and arrangements thereof in an indicator which is dependable, economical and fully effective in accomplishing its intended purposes.

These and other objects and advantages will become more fully apparent upon reference to the following description.

BRIEF DESCRIPTION OF THE DRAWINGS

FIG. 1 is a fragmentary axial section of a pneumatic tire and wheel mounted on an axle of an automotive vehicle and equipped with a pressure responsive indicator embodying the principles of the present invention shown in association with its electrical circuit.

FIG. 2 is a section taken on line 2—2 of FIG. 1, showing a brush contact of a pulse producing mechanism mounted in contact with the axle of the wheel.

FIG. 3 is a longitudinal section of the pressure responsive indicator of the present invention.

FIG. 4 is a transverse section taken at the position represented by line 4—4 of FIG. 3.

FIG. 5 is a fragmentary enlarged longitudinal section of a second form of indicator showing means to indicate both an increase and a decrease in tire pressure.

FIG. 6 is a further enlarged fragmentary longitudinal section of the indicator, somewhat similar to FIG. 5, but illustrating a third form for detecting an increase in tire pressure beyond a specified value.

FIG. 7 is a central longitudinal section through a fourth form of indicator capable of indicating both an increase and a decrease in tire pressure.

FIG. 8 is a somewhat enlarged fragmentary elevation of the pressure responsive member and dual electrical contact assembly removed from the indicator with portions broken away for illustrative convenience.

FIG. 9 is a somewhat enlarged fragmentary transverse vertical section through the indicator taken generally along the line 9—9 of FIG. 7.

FIG. 10 is a somewhat enlarged perspective of an electrical spring contact removed from the indicator.

DESCRIPTION OF THE PREFERRED EMBODIMENTS

Referring in greater detail to the drawings, in FIG. 1, a wheel 10 is shown mounted on the hub 11 of an axle housing 12. The wheel includes a rim 13 carried by an annular drop center 14 secured to the hub, as by conventional wheel bolts 15. The wheel is mounted on and driven by an axle 16 which is shown protruding through and beyond the hub and terminating in a circumferentially raised end extension 17 provided with a protrusion 18. A plate cover 20 covers the end extension and is bolted to the hub by bolts 21. The plate cover effects a weather and dirt seal for the end extension of the axle. A pneumatic tire 22 is mounted on the rim 13 and comprises an outer tread and wall portion 23 and an inner tube 24 defining a chamber 25. A tubular stem 26 provides pneumatic communication with the chamber and includes a mounting base 27 secured to the inside of the tube.

A pressure indicator 30 of the present invention is shown in detail in FIG. 3 and includes an electrically conductive tube 31 having threads 32 and 33 at each end respectively. Shoulders 34 and 35 are provided in the tube interiorly of the threaded portions 32 and 33, respectively, and a shoulder 36 is provided on the exterior of the tube midway between the ends. A groove 37 is provided on the exterior of the tube near one end. A valve housing 38, with a radial shoulder 39, is provided with external threads 40 and internal threads 41 at one end and external threads 42 at the other end. The housing is screw-threadably mounted within the conductive tube 31 along engaging threads 42 and 32. A valve 44 is screw-threaded into the housing along the internal threads 41 and is adapted to permit inflation and deflation of the tire in the well-known manner. The tubular stem 26 mounted within the chamber 25 is threaded into the conductive tube along threads 33. A nylon gasket 47 is positioned against the shoulder 35 of the conductive tube to provide a pressure seal between the stem and the shoulder.

A pressure responsive bellows 50 having a base 51 providing perforations 52 and 53 is mounted within the conductive tube 31 with the base abutting the shoulder 34. The bellows is made of an electrically conductive material and includes an end plate 54, compressible outer corrugations 55 and inner corrugations 56. A gasket 57 is mounted between the valve housing 40 and the base 51 to provide a pressure seal. Positioned inside the tube is an electrically conductive plug 58 providing an air passageway 60. An insulating ring 61 surrounds the plug and prevents a short circuit occurring between the plug and conductive tube. A contact setscrew 62 is adjustably mounted within the plug and is positioned with an end a predetermined distance from the end plate 54 of the bellows. The setscrew is fixed in position by an epoxy resin 63 and an electrically conductive positioning screw 64 is mounted in the conductive tube and extends therethrough. An insulating element 65 surrounds the positioning screw and also functions as a pressure seal. An insulating sleeve 66 is mounted on the conductive tube 31 against the shoulder 36 and a circumferential groove 67 is provided around the sleeve immediately above the positioning screw. A circular conducting ring 69 is positioned in the groove and provides a contact extending outwardly from the positioning screw. The conducting ring is slipped over the insulating sleeve and forced along the sleeve until it seats in the groove 67 thereby providing a tight fit.

An insulating sleeve 70 is mounted on the radial shoulder 39 of the valve housing 38 and extends the length of the conductive tube 31. The sleeve is removable by sliding it off in the direction of the valve housing. Insulated leads 71 and 72 are mounted within the sleeve 70, and the lead 71 connects to the groove 37 in the conductive tube through a clip connector 73. Lead 72 connects through a clip connector 74 to conducting ring 69.

To remove the pressure indicator, the insulating sleeve 70 is simply slipped off and the conductive tube 31 is unscrewed from the stem 26.

It will be observed that air pressure from the chamber 25 of the tire 22 normally is exerted in the direction shown by the arrows through the stem 26, air passageway 60, around the bellows 50 and through perforations 52 and 53 into the valve housing 38. When the tire is inflated through the air valve 44, the direction of air flow is temporarily reverse. The embodiment of the pressure indicator shown in FIG. 3 is adapted exclusively for indicating decreases in pressure below a specific level determined by positioning the end of the setscrew 62 relative to the end plate 54 of the bellows.

SECOND FORM

FIG. 5 illustrates a second form of the present invention in which both an increase and a decrease in pressure is indicated. An electrical conducting extension 75 includes a base 76, a sidewall 77 and inturned segment 78, the base of the extension being mounted on the end plate 54. An internally and externally threaded electrically conductive nut 79 is adjustably threaded through the plug 58 and the setscrew 62 is threaded through the nut. The nut is provided with an outer radial flange 80 positioned interiorly of the sidewall and adapted to contact segment 78 and the base 76. Motion of the bellows 50 in either direction eventually produces an electrical contact between the radial flange 80 and the segment 78 or between the base 76, and the setscrew 62 depending on the direction of motion of the bellows in contraction or expansion.

THIRD FORM

FIG. 6 illustrates an embodiment for signaling a rise in pneumatic pressure and shows an insulating sheet 83 positioned on the base 76 to insulate the radial flange 80 from the base. Contraction of the bellows produces a contact between segment 78 and the radial flange as before but expansion of the bellows produces no electrical contact.

Pressure indicator 30, as shown in FIG. 1, is mounted at the end of the tubular stem 26 and is provided with a cover 84 to protect the indicator against weather, dirt, corrosion, water, and the like. The only part of the indicator exposed is the valve housing 38 and this permits the tire 22 to be inflated and deflated without removing the indicator from the stem. The cover 84 is provided with contact points, not shown, which make an electrical connection with leads 71 and 72. An electric wire 87 is grounded at one end by connecting it to the plate cover 20. At its other end the electric wire is connected to lead 72. A contact brush 91 provided with conductive bristles 92 is bolted to, but insulated from the axle cover and is connected to lead 73 by an electrical wire 93. The brush is adapted successively to contact the protrusion 18 on the axle 16 upon rotation of the protrusion into contact with the brush and thereby to generate a series of pulses as the wheel 10 rotates. An electrical wire 94 connects the protrusion to the axle housing 11 by a bolt 95. A magnetic core transformer 96 is provided having a primary winding 97 and a secondary winding 100. One side of the primary winding is connected to the positive side of a dry cell battery 101 through a switch 102, which is located in the cab of the truck for convenience. The other side of the primary winding is connected to the bolt 95 with an electrical wire 103. The secondary winding of the transformer is connected across a glow discharge tube 104.

FOURTH FORM

A fourth form of pressure indicator embodying the principles of the present invention is shown in FIGS. 7 through 10 and is adapted to be releasably mounted on the end of the tubular stem 26 on the pneumatic tire 22 of FIG. 1 in substitution for the pressure indicator 30 of the first form. The fourth form of the present invention is effective to indicate an increase and a decrease in tire pressure and is conveniently adjustable to vary the high and low pressure settings for the indicator device. This form provides an electrically conductive tube 131 having internal screw threads 132 and 133 at each end thereof. The tube has an elongated bore 135 between its threaded ends and an outer cylindrical periphery 136 terminating in an annular shoulder 137 somewhat short of the threaded end 132 thereof to define a somewhat enlarged diameter head portion 138.

The screw-threaded end 133 of the tube 131 is mounted on the end of the tubular stem 26 of the pneumatic tire 22 and the threaded end 132 of the tube screw-threadably mounts an elongated valve housing adapter 140. The adapter provides an annular flange 142 of substantially the same diameter as the head 138 of the tube between which is disposed an annular air sealing O-ring 143. The valve housing adapter includes an elongated threaded bore 145 coaxially related to the bore 135 within the tube 131 and an outer externally screw-threaded end 146. A radial hole 147 is formed through the wall of the tube 131 intermediate its ends in communication with the axial bore 135 therein and includes an outer counterbore 148 in the cylindrical periphery 136 of the tube.

An elongated cylindrical pressure responsive bellows 150 is disposed within the cylindrical bore 135 of the tube 131. The bellows is made of an electrically conductive material and includes compressible outer corrugations 151 and inner corrugations 152. The bellows provides an end 154 which is borne by the flanged end 155 of an elongated adjusting setscrew 156 axially screw-threadably mounted within the threaded bore 145 of the valve housing adapter 140. The setscrew has an outer slotted end 157 and an elongated air passage 158 formed therein communicating with a plurality of radial passages 160 adjacent to the flanged end 155 thereof in communication with the cylindrical bore 135 within the tube 131.

The bellows 150 includes an opposite end 162 which mounts a dual electrical contact 164 having a flanged base secured to the bellows forming a first contact and a spaced frusto-conical head portion divergently coaxially extended from the base providing a second contact. The head includes a ramp portion 167 and an annular guide portion 168 which is slidably piloted within the bore 135 of the tube 131. As best shown in FIG. 9, the guide portion of the head provides a plurality of diametrically opposed flats 169 forming air passages 172 between the guide portion and the surface of the bore 135.

An elongated insulator sleeve 175 is slidably mounted on the cylindrical periphery 136 of the tube 131 and provides a shoulder 177 and a circular opening 178 therethrough intermediate its ends in registry with the counterbore 148 of the radial hole 147 through the wall of the tube 131. An annular band 180 of electrically conductive material is disposed in circumscribing relation to the insulator sleeve in circumscribing insulated relation to the tube 131. The band has a threaded bore 182 which, as best shown in FIG. 9, is aligned with the opening 178 in the sleeve and the radial hole 147 in the tube.

A stationary contact 185 is extended through the radial hole 147 for alternate engagement with the contacts 165 and 166 on the bellows 150. The stationary contact includes a threaded head portion 186 which is screw-threadably received within the bore 182 of the band 180 and an elongated depending pin 187 having an end 188 extended into the bore 135 of the tube between the spaced contacts 165 and 166. The pin 187 is insulated from the tube by an O-ring 189 disposed within the counterbore 148 and a dielectric grommet 192 having a flange portion 193 within the counterbore and a depending sleeve portion 195 fitted to the radial hole 147. It is noted that the pin and head may be axially adjusted radially of the bore 135 in the tube approximately one and one-half turns in order to adjust the spacing between the end 188 of the pin and the ramp 167 of the head portion or second contact of the dual contact 164.

An elongated cylindrical housing 200 is releasably mounted on the tube 131 for effectively shielding the pressure indicator against dirt, grease and the like and for coupling it to the electrical signaling circuit shown in FIG. 1 and includes a pair of electrical leads 201 and 202 corresponding to the lead wires 87 and 93 of the first form. The housing is constructed of a pair of inner and outer sleeves 205 and 206, respectively, which define therebetween a space 207 with the inner sleeve providing a shoulder 208 engageable with the annular band 180 around the tube 131. The inner sleeve further includes an end wall 210 having a bore 211 therethrough slidably receivable in circumscribing relation about the outer end 146 of the valve housing adapter 140. An annular helically wound spring tension contact 212 is mounted within the inner sleeve against the end wall 210 and provides a connecting tab 214 extended into a notch 215 in the end wall for connection to the lead 201. The helical contact 212 is engaged and compressed by the flange 142 of the valve housing adapter upon assembly of the housing on the tube 131.

A second spring contact 220 is mounted within the inner sleeve 205 of the housing and provides an arcuate locking end 222 which is adapted to snap over the annular band 180 with inner movement of the contact constrained by a foot portion 225 thereof disposed within the space 207 between the inner and outer sleeves. The lead 202 is extended through the space and is connected to the second spring contact 220 and is outwardly extended from the housing with the other lead 201.

A valve stem extension and valve mounting device 230 is screw-threadably mounted on the outer threaded end 146 of the adapter 140. A conventional air filling valve 235 is screw-threadably received within the stem extension for permitting inflation and deflation of the tire 22 in the well-known manner.

OPERATION OF THE FIRST FORM

The operation of the described embodiments of the present invention is believed to be clearly apparent and is briefly summarized at this point. Referring particularly to FIG. 3, the first embodiment of the invention is employed when it is desired to detect a fall in air pressure from the tire 22 below a predetermined level. This is accomplished by preadjusting the setscrew 62 a fixed distance from the end plate 54 of the bellows 50 prior to installing the pressure responsive indicator in the stem of the tire. When the air pressure in the tire has decreased below the critical level the bellows 50 expands and contacts the setscrew thereby completing an electric circuit within the pressure indicator 30. One part of the circuit includes the end plate 54, the corrugations 55 and 56, the base 51, the conductive tube 31 and the lead 71. The other part of the circuit includes the setscrew 62, the plug 58, the positioning screw 64, the conducting ring 69, the clip connector 74 and the lead 72. Completion of the circuit within the pressure indicator 30 takes place when end plate 54 contacts the setscrew 62. This grounds the lead 71 through the electrical wire 87 and connects the lead 72 through the wire 93 to the contact brush 91. A series of time spaced pulses is generated when successive rotations of the axle 16 brings the protrusion 18 into conductive contact with the bristles 93. Upon completion of the circuit inside indicator 30 and upon closing of the switch 102, the pulses pass along electric wires 94 and 103 into the primary winding of the transformer 96. This activates the secondary winding 98 and lights the glow discharge tube 104.

OPERATION OF THE SECOND AND THIRD FORMS

Completion of the circuit within the pressure indicator proceeds similarly for the embodiments shown in FIGS. 5 and 6 except that in the structure of FIG. 5 the attainment of both predetermined high and low pressure levels is signaled while in FIG. 6 only the attainment of a predetermined high level is signaled. This is evident by reference to the structures involved. In FIG. 5, when the bellows 50 contracts sufficiently incident to increased tire pressure, the segment 78 engages the element 80 to complete the electrical circuit. Conversely, when the tire pressure decreases sufficiently, the bellows expands enough for the setscrew 62 to engage the base 76, and complete the circuit. With the structure of FIG. 6, there is no signal upon pressure decrease because of the insulating sheet 83 but on pressure increase the segment 78 is drawn into engagement with the element 80 to complete the circuit.

Normally, each tire of the vehicle is provided with a pressure indicator 30 electrically connected to the glow tube 104. Illumination of the tube alerts the driver of the vehicle to attend to a tire inflation problem.

OPERATION OF THE FOURTH FORM

The fourth form of pressure indicator of the present invention is generally similar to the second form in that it is effective to indicate both a predetermined high and low pressure condition within the tire. In this form, however, the high and low pressure levels can be easily and conveniently adjusted when it is desired to vary the operating pressure limits within the tire under different weather and load conditions.

Prior to use, the tube 131 is mounted on the stem 26 and a screwdriver, not shown, is inserted into the valve housing adapter 140 for engagement with the slotted end 157 of the setscrew 156. The setscrew is rotated to advance the bellows 150 and the dual contact 164 axially within the bore 135 of the tube. Such movement continues until the base 165 or first contact engages the pin 187 of the stationary contact 185. The setscrew is then further tightened a predetermined amount in order to compress the bellows 150 for providing a predetermined preliminary setting which is to be subsequently overcome by the air pressure introduced through the indicating device into the tire.

The stationary contact 185 is adjusted prior to assembly of the insulated housing 200 over the tube 131 to extend the end 188 of the pin 187 into the bore 135 between the dual contacts 164. Air is introduced through the axial passage 158 in the setscrew which air is permitted to pass around the bellows and through the passages 172 and into the filling stem 26 of the tire. The reverse flow of air pressure is then exerted against the base contact 165 to force the base to the left, as viewed in FIG. 7, away from the pin 187 of the stationary contact. Depending upon the initial adjustment of the setscrew 156, the pin 187 of the stationary contact is disposed substantially midway between the base 165 and the ramp 167 of the head 166 of the dual contacts 164. Accordingly, if the pressure in the tire is reduced, the bellows 150 is permitted to expand and to extend the base 165 to a position engaging the pin of the stationary contact to complete the electrical circuit through the indicator.

Upon an increase in tire pressure, the bellows 150 is contracted and the dual contacts 164 actuated to the left, as viewed in FIG. 7. Upon such movement, the end 188 of the pin 187 of the stationary contact 185 engages the ramp 167 of the frustoconical head 166 of the dual contact again to energize the signaling circuit to warn of such increased pressure. The particular high level at which the signaling device is actuated can be varied by manipulation of the stationary contact 185. As described, the head portion 186 can be rotated approximately one and one-half turns in either direction to vary the spacing between the pin 187 and the ramp of the head 166 of the dual contact 164.

The above described adjustments of the high and low pressure levels at which the signaling circuit is energized can be quickly and conveniently accomplished by removing the insulated housing 200. During such removal, the spring contact 220 moves upwardly into the space 207 between the inner and outer sleeves 202 and 205 easily to slide over the annular band 180, the tube 131 and the stem extension 230. This exposes the slotted head of the stationary contact 185 and the slotted end 157 of the setscrew 156 is accessible through the bore in the stem extension 230 after removal of the valve 235 therein and the bore 145 in the outer end of the valve housing adapter 140. After the desired adjustments have been made, the insulated housing 200 is conveniently replaced on the tube 131 and the electrical connections between the contacts made without requiring the removal or reconnection of the lead wires 201 and 202.

It will therefore be seen that the pressure indicator of the several embodiments of this invention provides an extremely reliable and simple indicator with the only movable element being the bellows 50 and 150 and only an adjustment of the setscrews 62, 156 and contact 185 being necessary to determine the pressure levels at which the device will operate. By providing a warning in the case of an over-heated tire, a deflated tire, or other hazard causing pressure variation, a serious accident can be prevented. Where under-inflation of the tire becomes sufficiently significant, the tire is inflated to a suitable pressure level and achieves substantially greater durability.

Having described my invention, what I claim as new and desire to secure by Letters Patent is:

1. A pressure indicator for a pneumatic tire mounted on a wheel of a vehicle comprising a tubular member of electrically conductive material having an end adapted for connection to such a tire in pneumatic communication with the interior thereof and an opposite end, said member having a substantially cylindrical external surface; a tubular valve stem releasably connected to said opposite end of the tubular member; an inflating valve mounted in the valve stem; an insulated housing integral with the stem circumscribing the tubular member and having an open end adjacent to the connection end of the tubular member to accommodate removal of the housing with the stem from the tubular member; electrically conductive pressure responsive means mounted within the tubular member in contact therewith adapted to expand and to contract in response to pressure variations in the tubular member; a first electrical contact borne by the pressure responsive means and movable in a predetermined path incident to contraction and expansion thereof; a second electrical contact disposed in said path for intermittent engagement with the first contact; a conducting ring circumscribing the tubular member and insulated therefrom; electrically conductive means interconnecting the second contact and the ring, the external surface of the tubular member providing a circumscribing groove; and a pair of electrically conductive spring clips mounted on the housing releasably slidably engageable individually with the groove and the ring when the stem is connected to the tubular member with the housing circumscribing the tubular member having independent electrical communication through the housing.

2. The indicator of claim 1 in which the stem is screw-threadably connected to the tubular member and the clips are slidable helically about the housing as the housing is rotated in screwing the stem on and off of the tubular member.

3. The indicator of claim 1 in which the second contact is a setscrew mounted in alignment with said path of movement for adjustment longitudinally of the path.

4. The indicator of claim 3 in which the conductive means interconnecting the second contact and the ring is a setscrew adapted to be tightened radially against the setscrew of the second contact to secure it in position.

5. The indicator of claim 1 in which the first contact has a base, arms extended outwardly from the base, and inturned segments integral with the arms disposed in spaced relation to the base; and the second contact is disposed between the arms for alternate engagement with the base and the inturned segments incident to contraction and expansion of the pressure responsive means.

6. A pressure indicator for use with a pneumatic tire mounted on a vehicular axle comprising a hollow electrically conductive tube having first and second openings; a pneumatic tire having a gas confining interior communicating with the first opening of the tube; an inflating valve mounted in the second opening of the tube; an electrically conductive bellows positioned within and in electric contact with the tube and adaped for expansion and contraction by pressure changes of the tire; a conductive setscrew mounted within and insulated from the tube, the setscrew being positionable with respect to the bellows for contact with the bellows upon a predetermined pressure change of the tire; an electrically conductive positioning screw electrically connected to the setscrew and adapted to maintain the setscrew in a fixed position, the positioning screw being secured within and insulated from the tube; a conductor circumscribing the tube and insulated therefrom, the conductor contacting the positioning screw; an insulated sleeve surrounding the tube; electric leads carried by the insulated sleeve and adapted for electrical contact with the tube and conductor respectively; a source of electrical current; a conductive brush adapted for intermittent electric contact with the axle during rotation of the axle for generating electric pulses and electrically connected to the source of electric current; one of said leads being electrically connected to the conductive brush and the other of said leads being at low potential; and signal producing means actuatable by the electric pulses upon contact of the bellows with the setscrew.

7. The indicator of claim 6 which provides a conductor mounted at the end of the bellows and extending therefrom, the conductor comprising a base and connecting sidewall, the end of the sidewall providing an inturned segment; a conducting radial flange mounted at the end of the setscrew, positioned interiorly of the sidewall; the base being adapted electrically to contact the flange upon expansion of the bellows and the segment being adapted to contact the flange upon contraction of the bellows.

8. A pressure indicator according to claim 7 in which an insulator is positioned between the base and flange.

9. A pressure indicator for a pneumatic tire mounted on a wheel of a vehicle comprising an electrically conductive tube having an end adapted for connection to such a tire in pneumatic communication with the interior thereof and an opposite end releasably mounting a valve housing, an electrically conductive pressure responsive member mounted within the tube intermediate its ends for extension and retraction incident to pressure changes in the tire, spaced electrical contacts mounted on said pressure responsive means for movement therewith, and a stationary electrical contact mounted within the tube between said spaced contacts on the pressure responsive member for alternate engagement with the spaced contacts in circuit completing relation for energizing signal producing means to indicate predetermined high and low pressures in the tire, said spaced contacts on the pressure responsive member including a base secured to the pressure responsive member and a frusto-conical head divergently coaxially extended from the base with said stationary electrical contact with the tube radially extended between the base and head for alternate engagement therewith incident to extension and retraction of said pressure responsive member.

10. The pressure indicator of claim 9 in which said frusto-conical head provides an inclined ramp surface, said stationary contact having an elongated electrically conductive pin extended between the ramp surface and the base in spaced substantially centered relation therebetween when the tire is at a predetermined desired pressure, and means radially adjustably mounting said pin in the tube in insulated relation thereto for varying the effective distance between the head and the base in the plane of the pin.

11. The pressure indicator of claim 10 including an elongated setscrew coaxially screw-threadably mounted within said valve housing end of the tube and having a slotted outer end accessible through said valve housing and an opposite inner end coaxially mounting said pressure responsive member and said spaced contacts within the tube for axial adjustable movement of said base of the contacts to an initial setting against said pin of the stationary contact in compressing relation to said pressure responsive member to provide a minimum pressure in the tire which is capable of overcoming the force of said pressure responsive member at said initial setting of the contacts normally to move and to hold said base away from the pin with said head of the contacts being responsive to a higher tire pressure further to compress the pressure responsive member and to move the head into pin engagement.

12. A pressure indicator for a pneumatic tire mounted on a wheel of a vehicle comprising a tubular member of electrically conductive material having an end adapted for connection to such a tire in pneumatic communication with the interior thereof and an opposite end; an electrically conductive bellows positioned within and in electric contact with the tubular member and adapted for extension and retraction incident to pressure changes in the tire; contact means mounted on said pressure responsive bellows in axially extended relation therefrom for movement with the bellows and providing a base portion secured to the bellows and an axially spaced frusto-conical head portion divergently extended from the base; a stationary electrical contact mounted in the tubular member and having a pin portion radially inwardly extended between the base and head portions of said contact means for alternate engagement therewith during said extension and retraction of the bellows; and an elongated cylindrical insulated housing providing spaced internally disposed electrical contacts individually engageable with said tubuar member and said stationary contact in the tubular member with said contacts in the housing being exteriorly connected to signal producing means on the vehicle to indicate predetermined high and low pressures in the tire incident to said alternate engagement between said base and head portions of the contact means with said stationary contact pin in the tubular member.

13. The pressure indicator of claim 12 in which said tubular member includes a radial bore aligned with said contact means therein for receiving said stationary contact therethrough, air sealing and insulating means disposed within said bore in circumscribing relation to said stationary contact, an annular electrically conductive band circumscribing said tubular member in insulated relation thereto screw-threadably mounting said stationary contact for limited axial adjustment radially inwardly of said tubular member and said contact means, said one of the contacts in said housing comprising an elongated spring plate having an arcuate locking end, said other contact of the housing comprising a helical spring member within the housing for endward engagement with said tubular member tensioning said housing toward a retracted position from the tubular member and with said arcuate locking end of the other contact snapping over said annular band releasably to hold the housing in operating position on said tubular member.

References Cited

UNITED STATES PATENTS 2,554,594   5/1951   Shea _____ 340—58
3,430,196   2/1969   Dalton _____ 340—58

ALVIN H. WARING, Primary Examiner

U.S. Cl. X.R.

200—61.25; 116—34